US012625263B2

(12) United States Patent
Bohannon et al.

(10) Patent No.: US 12,625,263 B2
(45) Date of Patent: May 12, 2026

(54) DIGITAL ELECTRO-OPTICAL PHASE LOCKED LOOP IN A LiDAR SYSTEM

(71) Applicant: AEVA, INC., Mountain View, CA (US)

(72) Inventors: Eric Bohannon, Mountain View, CA (US); Garret Phillips, Pittsford, NY (US); Bryce Bradford, Cupertino, CA (US)

(73) Assignee: Aeva, Inc., Mountain View, CA (US)

(*) Notice: Subject to any disclaimer, the term of this patent is extended or adjusted under 35 U.S.C. 154(b) by 762 days.

(21) Appl. No.: 18/104,186

(22) Filed: Jan. 31, 2023

(65) Prior Publication Data

US 2024/0255642 A1     Aug. 1, 2024

(51) Int. Cl.
    *G01C 3/08*      (2006.01)
    *G01S 7/481*     (2006.01)
    *G01S 17/34*     (2020.01)

(52) U.S. Cl.
    CPC ............ *G01S 17/34* (2020.01); *G01S 7/4817* (2013.01)

(58) Field of Classification Search
    CPC ....... G01S 17/34; G01S 7/4817; G01S 7/4911
    See application file for complete search history.

(56) References Cited

U.S. PATENT DOCUMENTS

| 2010/0085992 A1* | 4/2010 | Rakuljic ............... G01S 7/4911 |
| | | 372/20 |
| 2021/0083449 A1* | 3/2021 | Wojciechowski .... H01S 5/0687 |
| 2021/0328402 A1* | 10/2021 | Hu ..................... G01B 9/02072 |

FOREIGN PATENT DOCUMENTS

| CN | 112083401 A | * 12/2020 | ............ G01S 7/497 |

* cited by examiner

*Primary Examiner* — Mark Hellner
(74) *Attorney, Agent, or Firm* — Womble Bond Dickinson (US) LLP

(57) ABSTRACT

The FMCW LiDAR system includes an optical drive electronic circuit to receive a reference frequency signal and a beat frequency signal to generate a drive signal. The optical drive electronic circuit includes a TDC to calculate a phase difference between the reference frequency signal and the beat frequency signal and a digital ramp control to: provided the phase difference is a positive value, produce a ramp down control signal to increase a current chirp rate to an increased chirp rate; provided the phase difference is a negative value, produce a ramp up control signal to decrease the current chirp rate to a decreased chirp rate. The optical drive electronic circuit includes a digital integrator to generate a digital output based on at least one of the ramp down control signal or the ramp up control signal and a DAC to convert the digital output to an analog output.

20 Claims, 6 Drawing Sheets

500

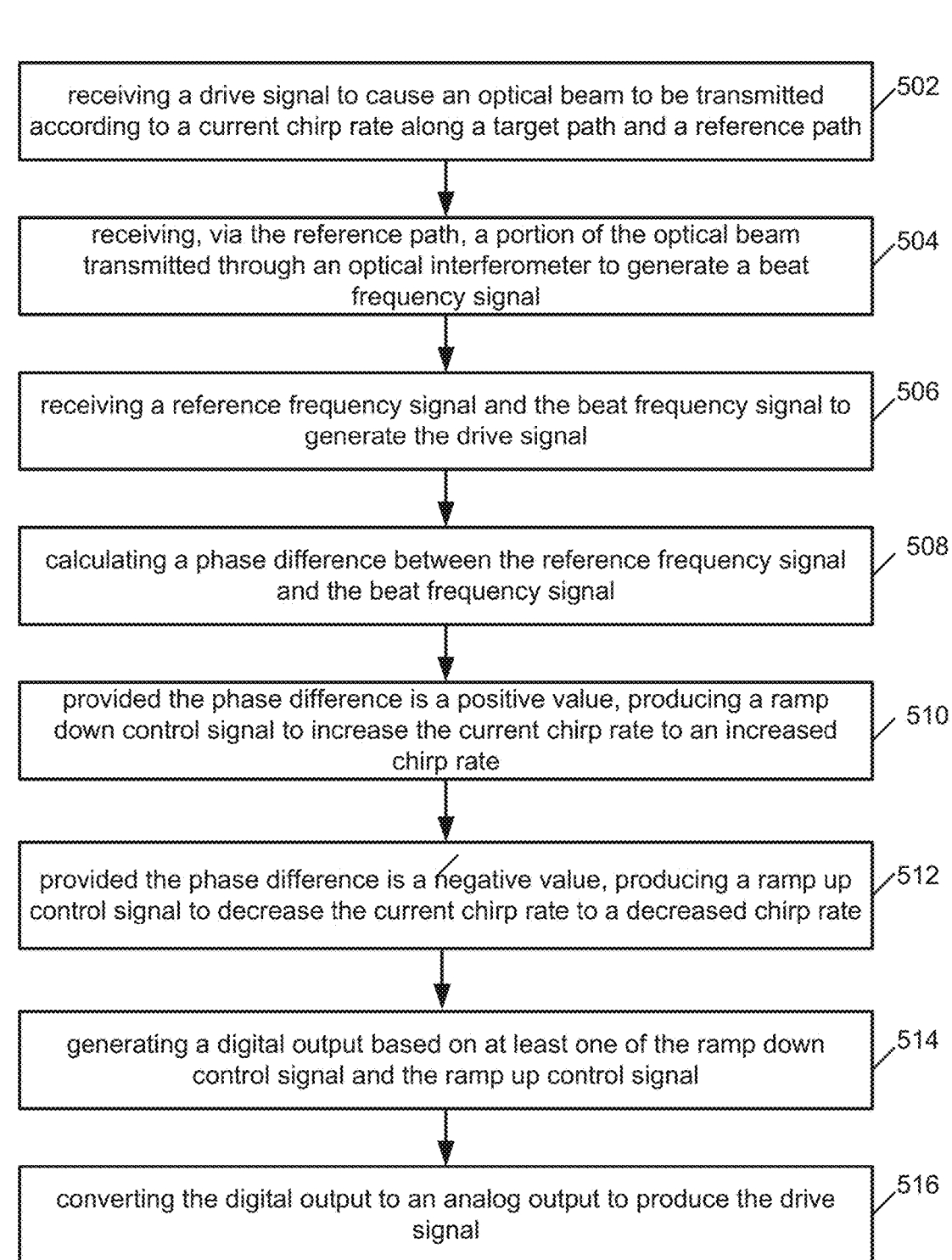

receiving a drive signal to cause an optical beam to be transmitted according to a current chirp rate along a target path and a reference path ⌐502 receiving, via the reference path, a portion of the optical beam transmitted through an optical interferometer to generate a beat frequency signal ⌐504 receiving a reference frequency signal and the beat frequency signal to generate the drive signal ⌐506 calculating a phase difference between the reference frequency signal and the beat frequency signal ⌐508 provided the phase difference is a positive value, producing a ramp down control signal to increase the current chirp rate to an increased chirp rate ⌐510 provided the phase difference is a negative value, producing a ramp up control signal to decrease the current chirp rate to a decreased chirp rate ⌐512 generating a digital output based on at least one of the ramp down control signal and the ramp up control signal ⌐514 converting the digital output to an analog output to produce the drive signal ⌐516

FIG. 5

DIGITAL ELECTRO-OPTICAL PHASE LOCKED LOOP IN A LiDAR SYSTEM

TECHNICAL FIELD

The present disclosure relates generally to light detection and ranging (LiDAR) systems, and more particularly to an electro-optical phase locked loop (EOPLL) in a LIDAR system.

BACKGROUND

In coherent LiDAR techniques such as Frequency-Modulated Continuous-Wave radar (FMCW) LiDAR, both the distance and the speed of a target affects the mixing frequency between the Local Oscillator (LO) and the return signal. To sense both the distance and the speed, LiDAR systems may use frequency modulation signals referred to as a down-chirp and an up-chirp. The down-chirp and the up-chirp can be carried within the same optical beam. Often a laser diode may be used as an optical source for generating the optical beam. The laser diode generates the optical beam at a wavelength that is proportional to the magnitude of the current through it. Modulating the current in turn modulates the frequency of the optical beam and generates the chirps.

The laser diver, which is the circuitry used to generate and control the optical beam, may include an EOPLL. Conventionally, the EOPLL is an analog EOPLL. However, the analog EOPLL may occupy a large physical area. In order to make changes to the analog EOPLL, an old analog component may have to be physically removed and a new analog component may have to physically installed, which may be time consuming. Furthermore, it is difficult to increase the scalability and flexibility with the analog EOPLL.

SUMMARY

The present disclosure describes various examples of a digital EOPLL in LiDAR systems, e.g., in a FMCW LiDAR system.

In some examples, disclosed herein is an optical drive control circuit (e.g., a laser diode control circuit) of a FMCW LiDAR system with a digital EOPLL. The digital EOPLL may include a time-to-digital converter (TDC) and a digital loop filter, which may be significantly smaller than a conventional analog loop filter. The digital EOPLL may include a digital ramp control and a digital integrator. The output of the digital integrator may drive a digital to analog converter (DAC), which may then drive the laser diode to adjust the modulating current. The digital EOPLL may have a small area footprint and allow for the increased portability. In addition, the digital EOPLL may increase the scalability and flexibility of the laser diode control circuit. The digital EOPLL is easily scalable due to the small geometry complementary metal-oxide-semiconductor (CMOS) technologies, for example, with external power field effect transistor (FET). The digital EOPLL is flexible because it is programmable and configurable, for example, by a processor.

In some examples, an FMCW LiDAR system is provided herein. The FMCW LiDAR system includes an optical source to receive a drive signal to cause an optical beam to be transmitted according to a current chirp rate along a target path and a reference path. The FMCW LiDAR system includes a photodetector to receive, via the reference path, a portion of the optical beam transmitted through an optical interferometer to generate a beat frequency signal. The FMCW LiDAR system includes an optical drive electronic circuit to receive a reference frequency signal and the beat frequency signal to generate the drive signal. The optical drive electronic circuit includes a time-to-digital convertor (TDC) to calculate a phase difference between the reference frequency signal and the beat frequency signal. The optical drive electronic circuit includes a digital ramp control to: provided the phase difference is a positive value, produce a ramp down control signal to increase the current chirp rate to an increased chirp rate; provided the phase difference is a negative value, produce a ramp up control signal to decrease the current chirp rate to a decreased chirp rate. The optical drive electronic circuit includes a digital integrator to generate a digital output based on at least one of the ramp down control signal or the ramp up control signal. The optical drive electronic circuit includes a digital to analog convertor to convert the digital output to an analog output to produce the drive signal.

In some examples, a method of operating a FMCW LiDAR system is provided herein. The method includes receiving a drive signal to cause an optical beam to be transmitted according to a current chirp rate along a target path and a reference path. The method includes receiving, via the reference path, a portion of the optical beam transmitted through an optical interferometer to generate a beat frequency signal. The method includes receiving a reference frequency signal and the beat frequency signal to generate the drive signal. The method further includes calculating a phase difference between the reference frequency signal and the beat frequency signal. The method further includes that, provided the phase difference is a positive value, producing a ramp down control signal to increase the current chirp rate to an increased chirp rate; provided the phase difference is a negative value, producing a ramp up control signal to decrease the current chirp rate to a decreased chirp rate. The method further includes generating a digital output based on at least one of the ramp down control signal or the ramp up control signal. The method further includes converting the digital output to an analog output to produce the drive signal.

In some examples, an electro-optical system is provided herein. The electro-optical system includes an optical drive electronic circuit to receive a reference frequency signal and the beat frequency signal to generate the drive signal. The optical drive electronic circuit includes a time-to-digital convertor (TDC) to calculate a phase difference between the reference frequency signal and the beat frequency signal. The optical drive electronic circuit includes a digital ramp control to: provided the phase difference is a positive value, produce a ramp down control signal to increase the current chirp rate to an increased chirp rate; provided the phase difference is a negative value, produce a ramp up control signal to decrease the current chirp rate to a decreased chirp rate. The optical drive electronic circuit includes a digital integrator to generate a digital output based on at least one of the ramp down control signal or the ramp up control signal. The optical drive electronic circuit includes a digital to analog convertor to convert the digital output to an analog output to produce the drive signal.

It should be appreciated that, although one or more embodiments in the present disclosure depict the use of point clouds, embodiments of the present invention are not limited as such and may include, but are not limited to, the use of point sets and the like.

These and other aspects of the present disclosure will be apparent from a reading of the following detailed description together with the accompanying figures, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and examples, should be viewed as combinable unless the context of the disclosure clearly dictates otherwise.

It will therefore be appreciated that this Summary is provided merely for purposes of summarizing some examples so as to provide a basic understanding of some aspects of the disclosure without limiting or narrowing the scope or spirit of the disclosure in any way. Other examples, aspects, and advantages will become apparent from the following detailed description taken in conjunction with the accompanying figures which illustrate the principles of the described examples.

BRIEF DESCRIPTION OF THE DRAWINGS

For a more complete understanding of various examples, reference is now made to the following detailed description taken in connection with the accompanying drawings in which like identifiers correspond to like elements:

FIG. 5 is a flow diagram illustrating an example of a method of using a digital EOPLL in a LIDAR system according to embodiments of the present disclosure.

DETAILED DESCRIPTION

Figure 1A:
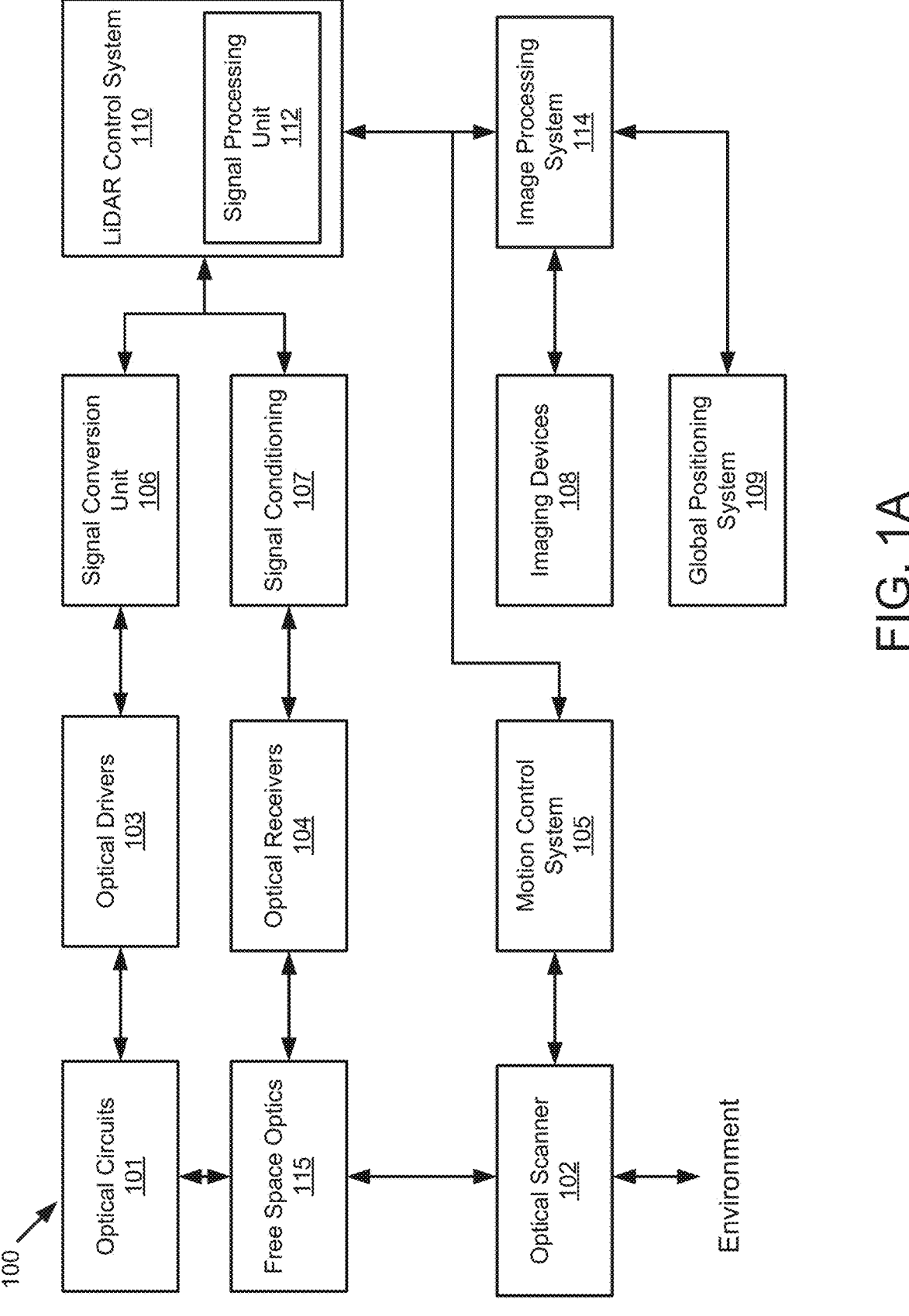
FIG. 1A is a block diagram illustrating an example LiDAR system according to embodiments of the present disclosure.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

The described LiDAR systems herein may be implemented in any sensing market, such as, but not limited to, transportation, manufacturing, metrology, medical, virtual reality, augmented reality, and security systems. According to some embodiments, the described LiDAR system may be implemented as part of a front-end of frequency modulated continuous-wave (FMCW) device that assists with spatial awareness for automated driver assist systems, or self-driving vehicles.

In some embodiments, the present disclosure are directed to a closed loop electro-optical system that generates a linear chirp from an optical source for use in an improved scanning LiDAR system. Many LiDAR systems use a laser diode as the optical source for generating the optical beam used to scan the target environment. To measure distance and speed simultaneously or near simultaneously, the optical beam can be frequency modulated to generate up-chirps and down-chirps. Modulating the optical frequency involves modulating the flow of current through the laser diode.

The laser diode may be driven by a bias current that causes the laser diode to emit light at a base frequency and a modulation current that causes the frequency of the emitted light to vary around the base frequency. The current levels used to excite the laser diode may be any level of current great enough to stimulate laser emission. Typically, the bias current and the modulation current are driven by the same circuitry. The circuit components used to handle such large currents will usually be relatively large and often implemented in discrete circuit elements. In some LiDAR applications, the LiDAR equipment and associated circuitry may be expected to fit within a small form factor.

Embodiments of the present disclosure describe an optical drive electronic circuit with a digital EOPLL. The conventional analog EOPLL may be digitized by the digital EOPLL. The digital EOPLL may include mostly digital logic component. The conventional phase frequency detector (PFD) may be replaced by a time-to-digital converter (TDC). The conventional analog loop filter may be replaced by a digital loop filter, which may be significantly smaller. The conventional analog ramp control and integrator may be replaced by a digital ramp control and a digital integrator. The output of the digital integrator may drive a DAC, which may then drive the laser diode to adjust the modulating current. The digital EOPLL may have a small area footprint and allow for the increased portability. In addition, the digital EOPLL may increase the scalability and flexibility of the laser diode control circuit. The digital EOPLL is easily scalable due to the small geometry CMOS technologies, for example, with external power FET. The digital EOPLL is programmable and configurable, for example, by a processor.

FIG. 1A illustrates a LiDAR system 100 according to example implementations of the present disclosure. The LiDAR system 100 includes one or more of each of a number of components, but may include fewer or additional components than shown in FIG. 1A. According to some embodiments, one or more of the components described herein with respect to LiDAR system 100 can be implemented on a photonics chip. The optical circuits 101 may include a combination of active optical components and passive optical components. Active optical components may generate, amplify, and/or detect optical signals and the like. In some examples, the active optical component includes optical beams at different wavelengths, and includes one or more optical amplifiers, one or more optical detectors, or the like.

Free space optics 115 may include one or more optical waveguides to carry optical signals, and route and manipulate optical signals to appropriate input/output ports of the active optical circuit. The free space optics 115 may also include one or more optical components such as taps, wavelength division multiplexers (WDM), splitters/combiners, polarization beam splitters (PBS), collimators, couplers or the like. In some examples, the free space optics 115 may include components to transform the polarization state and direct received polarized light to optical detectors using a PBS, for example. The free space optics 115 may further include a diffractive element to deflect optical beams having different frequencies at different angles.

In some examples, the LiDAR system 100 includes an optical scanner 102 that includes one or more scanning mirrors that are rotatable along an axis (e.g., a slow-moving-axis) that is orthogonal or substantially orthogonal to the fast-moving-axis of the diffractive element to steer optical signals to scan a target environment according to a scanning pattern. For instance, the scanning mirrors may be rotatable by one or more galvanometers. Objects in the target environment may scatter an incident light into a return optical beam or a target return signal. The optical scanner 102 also collects the return optical beam or the target return signal, which may be returned to the passive optical circuit component of the optical circuits 101. For example, the return optical beam may be directed to an optical detector by a polarization beam splitter. In addition to the mirrors and galvanometers, the optical scanner 102 may include components such as a quarter-wave plate, lens, anti-reflective coating window or the like.

To control and support the optical circuits 101 and optical scanner 102, the LiDAR system 100 includes LiDAR control systems 110. The LiDAR control systems 110 may include a processing device for the LiDAR system 100. In some examples, the processing device may be one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. The processing device may also be one or more special-purpose processing devices such as an application specific integrated circuit (ASIC), a field programmable gate array (FPGA), a digital signal processor (DSP), network processor, or the like.

In some examples, the LiDAR control systems 110 may include a signal processing unit 112 such as a digital signal processor (DSP). The LiDAR control systems 110 are configured to output digital control signals to control optical drivers 103. In some examples, the digital control signals may be converted to analog signals through signal conversion unit 106. For example, the signal conversion unit 106 may include a digital-to-analog converter. The optical drivers 103 may then provide drive signals to active optical components of optical circuits 101 to drive optical sources such as lasers and amplifiers. In some examples, several optical drivers 103 and signal conversion units 106 may be provided to drive multiple optical sources.

The LiDAR control systems 110 are also configured to output digital control signals for the optical scanner 102. A motion control system 105 may control the galvanometers of the optical scanner 102 based on control signals received from the LiDAR control systems 110. For example, a digital-to-analog converter may convert coordinate routing information from the LiDAR control systems 110 to signals interpretable by the galvanometers in the optical scanner 102. In some examples, a motion control system 105 may also return information to the LiDAR control systems 110 about the position or operation of components of the optical scanner 102. For example, an analog-to-digital converter may in turn convert information about the galvanometers' position to a signal interpretable by the LiDAR control systems 110.

The LiDAR control systems 110 are further configured to analyze incoming digital signals. In this regard, the LiDAR system 100 includes optical receivers 104 to measure one or more beams received by optical circuits 101. For example, a reference beam receiver may measure the amplitude of a reference beam from the active optical component, and an analog-to-digital converter converts signals from the reference receiver to signals interpretable by the LiDAR control systems 110. Target receivers measure the optical signal that carries information about the range and velocity of a target in the form of a beat frequency, modulated optical signal. The reflected beam may be mixed with a second signal from a local oscillator. The optical receivers 104 may include a high-speed analog-to-digital converter to convert signals from the target receiver to signals interpretable by the LiDAR control systems 110. In some examples, the signals from the optical receivers 104 may be subject to signal conditioning by signal conditioning unit 107 prior to receipt by the LiDAR control systems 110. For example, the signals from the optical receivers 104 may be provided to an operational amplifier for amplification of the received signals and the amplified signals may be provided to the LiDAR control systems 110.

In some applications, the LiDAR system 100 may additionally include one or more imaging devices 108 configured to capture images of the environment, a global positioning system 109 configured to provide a geographic location of the system, or other sensor inputs. The LiDAR system 100 may also include an image processing system 114. The image processing system 114 can be configured to receive the images and geographic location, and send the images and location or information related thereto to the LiDAR control systems 110 or other systems connected to the LiDAR system 100.

In operation according to some examples, the LiDAR system 100 is configured to use nondegenerate optical sources to simultaneously measure range and velocity across two dimensions. This capability allows for real-time, long range measurements of range, velocity, azimuth, and elevation of the surrounding environment.

In some examples, the scanning process begins with the optical drivers 103 and LiDAR control systems 110. The LiDAR control systems 110 instruct the optical drivers 103 to independently modulate one or more optical beams, and these modulated signals propagate through the passive optical circuit to the collimator. The collimator directs the light at the optical scanning system that scans the environment over a preprogrammed pattern defined by the motion control system 105. The optical circuits 101 may also include a polarization wave plate (PWP) to transform the polarization of the light as it leaves the optical circuits 101. In some examples, the polarization wave plate may be a quarter-wave plate or a half-wave plate. A portion of the polarized light may also be reflected back to the optical circuits 101. For example, lensing or collimating systems used in LiDAR system 100 may have natural reflective properties or a reflective coating to reflect a portion of the light back to the optical circuits 101.

Optical signals reflected back from the environment pass through the optical circuits 101 to the receivers. Because the polarization of the light has been transformed, it may be reflected by a polarization beam splitter along with the portion of polarized light that was reflected back to the optical circuits 101. Accordingly, rather than returning to the same fiber or waveguide as an optical source, the reflected light is reflected to separate optical receivers. These signals interfere with one another and generate a combined signal.

Each beam signal that returns from the target produces a time-shifted waveform. The temporal phase difference between the two waveforms generates a beat frequency measured on the optical receivers (photodetectors). The combined signal can then be reflected to the optical receivers 104.

The analog signals from the optical receivers 104 are converted to digital signals using ADCs. The digital signals are then sent to the LiDAR control systems 110. A signal processing unit 112 may then receive the digital signals and interpret them. In some embodiments, the signal processing unit 112 also receives position data from the motion control system 105 and galvanometers (not shown) as well as image data from the image processing system 114. The signal processing unit 112 can then generate a 3D point cloud with information about range and velocity of points in the environment as the optical scanner 102 scans additional points. The signal processing unit 112 can also overlay a 3D point cloud data with the image data to determine velocity and distance of objects in the surrounding area. The system also processes the satellite-based navigation location data to provide a precise global location.

Figure 1B:
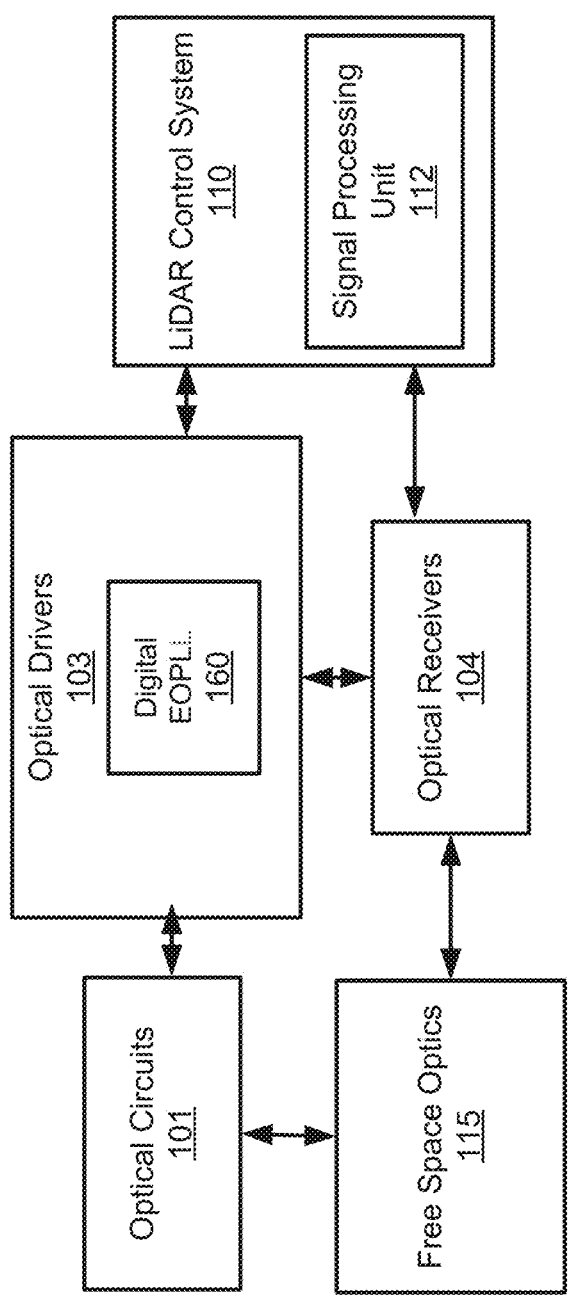
FIG. 1B is a block diagram illustrating an example of a digital EOPLL in a LiDAR system according to embodiments of the present disclosure.

FIG. 1B is a block diagram illustrating an example of optical drivers 103 in the LiDAR system 100 according to embodiments of the present disclosure. The LiDAR system 100 includes a digital EOPLL 160 in the optical drivers 103. The digital EOPLL 160 may include a time-to-digital converter (TDC) and a digital loop filter. The digital EOPLL 160 may include a digital ramp control and a digital integrator. The output of the digital integrator may drive a DAC, which may then drive the laser diode to adjust the modulating current. The digital EOPLL 160 may have a small area footprint and allow for the increased portability. In addition, the digital EOPLL 160 may increase the scalability and flexibility of the laser diode control circuit. The digital EOPLL 160 is easily scalable due to the small geometry CMOS technologies, for example, with external FET. The digital EOPLL 160 is programmable and configurable, for example, by a processor.

Figure 2:
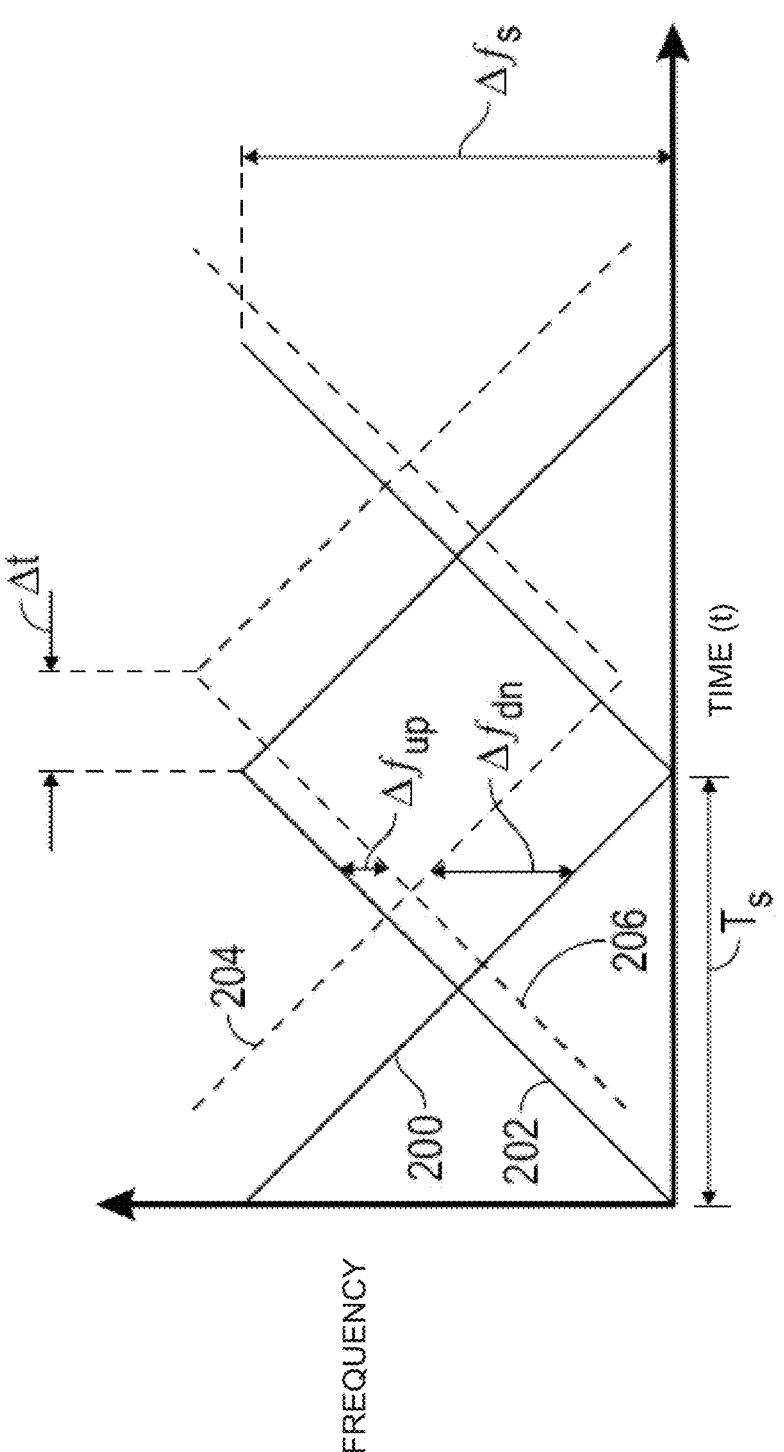
FIG. 2 is a time-frequency diagram illustrating an example of FMCW LiDAR waveforms according to embodiments of the present disclosure.

FIG. 2 is a time-frequency diagram of FMCW scanning signals that can be used by a LiDAR system according to some embodiments. The FMCW scanning signals 200 and 202 may be used in any suitable LiDAR system, including the system 100, to scan a target environment. The scanning signal 200 may be a triangular waveform with an up-chirp and a down-chirp having a same bandwidth $\Delta f_s$ and period $T_s$. The other scanning signal 202 is also a triangular waveform that includes an up-chirp and a down-chirp with bandwidth $\Delta f_s$ and period $T_s$. However, the two signals are inverted versions of one another such that the up-chirp on scanning signal 200 occurs in unison with the down-chirp on scanning signal 202.

FIG. 2 also depicts example return signals 204 and 206. The return signals 204 and 206, are time-delayed versions of the scanning signals 200 and 202, where $\Delta t$ is the round-trip time to and from a target illuminated by scanning signal 201. The round-trip time is given as $\Delta t = 2R/v$, where R is the target range and v is the velocity of the optical beam, which is the speed of light c. The target range, R, can therefore be calculated as $R = c(\Delta t/2)$.

In embodiments, the time delay $\Delta t$ is not measured directly but is inferred based on the frequency differences between the outgoing scanning waveforms and the return signals. When the return signals 204 and 206 are optically mixed with the corresponding scanning signals, a signal referred to as a "beat frequency" is generated, which is caused by the combination of two waveforms of similar but slightly different frequencies. The beat frequency indicates the frequency difference between the outgoing scanning waveform and the return signal, which is linearly related to the time delay $\Delta t$ by the slope of the triangular waveform.

If the return signal has been reflected from an object in motion, the frequency of the return signal will also be affected by the Doppler effect, which is shown in FIG. 2 as an upward shift of the return signals 204 and 206. Using an up-chirp and a down-chirp enables the generation of two beat frequencies, $\Delta f_{up}$ and $\Delta f_{dn}$. The beat frequencies $\Delta f_{up}$ and $\Delta f_{dn}$ are related to the frequency difference cause by the range, $\Delta f_{Range}$, and the frequency difference cause by the Doppler shift, $\Delta f_{Doppler}$, according to the following formulas:

$$\Delta f_{up} = \Delta f_{Range} - \Delta f_{Doppler} \tag{1}$$

$$\Delta f_{dn} = \Delta f_{Range} + \Delta f_{Doppler} \tag{2}$$

Thus, the beat frequencies $\Delta f_{up}$ and $\Delta f_{dn}$ can be used to differentiate between frequency shifts caused by the range and frequency shifts caused by motion of the measured object. Specifically, $\Delta f_{Doppler}$ is the difference between the $\Delta f_{up}$ and $\Delta f_{dn}$ and the $\Delta f_{Range}$ is the average of $\Delta f_{up}$ and $\Delta f_{dn}$.

The range to the target and velocity of the target can be computed using the following formulas:

$$\text{Range} = \Delta f_{Range} \frac{cT_s}{2\Delta f_s} \tag{3}$$

$$\text{Velocity} = \Delta f_{Doppler} \frac{\lambda_c}{2} \tag{4}$$

In the above formulas, $\lambda_c = c/f_c$ and $f_c$ is the center frequency of the scanning signal.

The beat frequencies can be generated, for example, as an analog signal in optical receivers 104 of system 100. The beat frequency can then be digitized by an analog-to-digital converter (ADC), for example, in a signal conditioning unit such as signal conditioning unit 107 in LiDAR system 100. The digitized beat frequency signal can then be digitally processed, for example, in a signal processing unit, such as signal processing unit 112 in system 100.

In some scenarios, to ensure that the beat frequencies accurately represent the range and velocity of the object, beat frequencies can be measured at the same moment in time, as shown in FIG. 2. Otherwise, if the up-chirp beat frequency and the down-chirp beat frequencies were measured at different times, quick changes in the velocity of the object could cause inaccurate results because the Doppler effect would not be the same for both beat frequencies, meaning that equations (1) and (2) above would no longer be valid. In order to measure both beat frequencies at the same time, the up-chirp and down-chirp can be synchronized and transmitted simultaneously using two signals that are multiplexed together.

Figure 3:
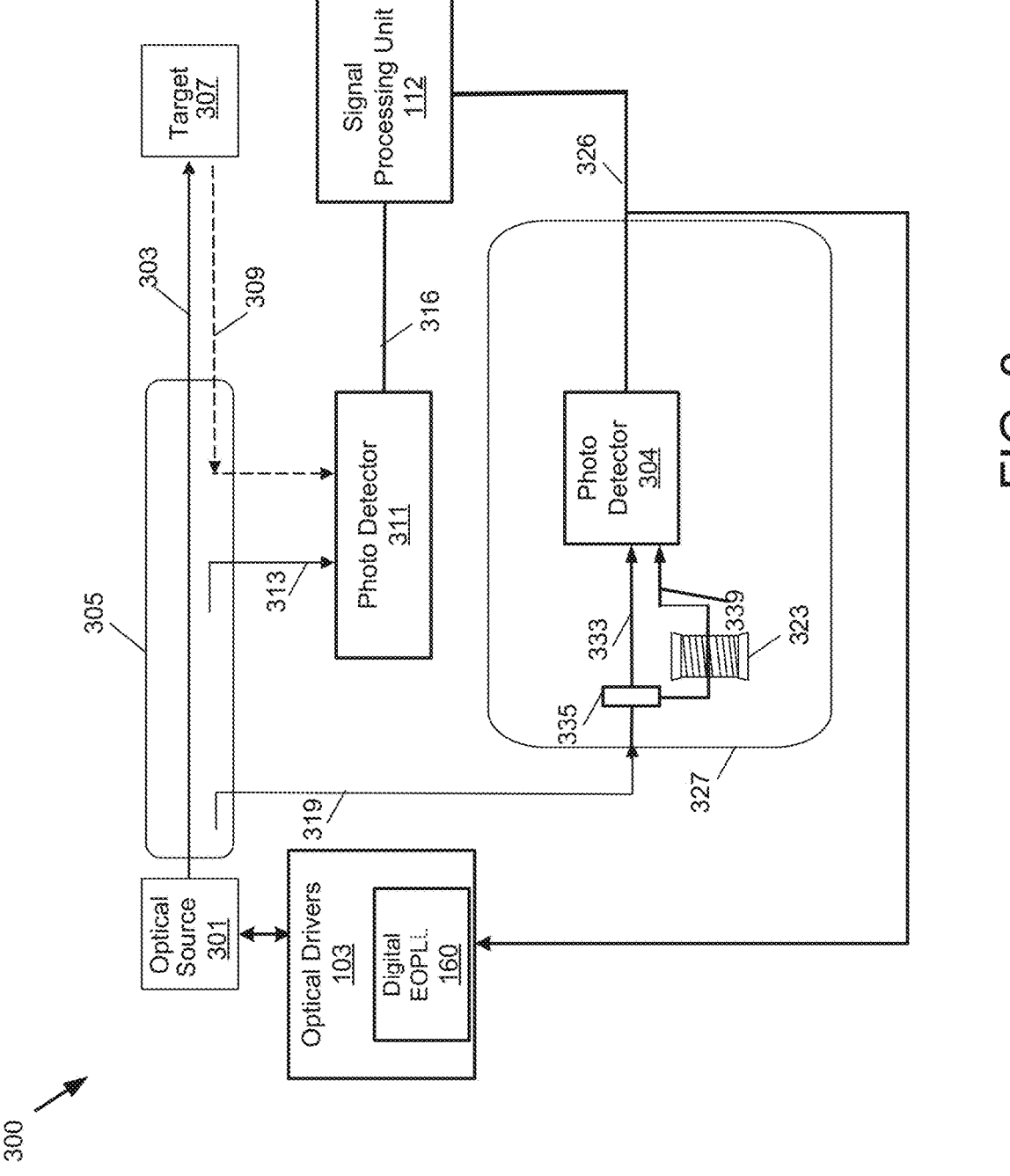
FIG. 3 is a block diagram illustrating an example of a LiDAR system using a digital EOPLL according to embodiments of the present disclosure.

FIG. 3 is a block diagram 300 illustrating an example of the LiDAR system 100 using the digital EOPLL 160, according to embodiments of the present disclosure. For instance, the system 100 includes the optical source 301, such as a laser diode. The optical source 301 is configured to emit one or more optical beams for performing LiDAR-based range and velocity detection. The optical source 301 may receive a drive signal, from optical drivers 103, to cause an optical beam to be transmitted according to a current chirp rate along a target path 305 and a reference path 327. In some embodiments, the optical beam(s) may be a frequency-modulated continuous wave (FMCW) optical beam. It should be appreciated that optical beam output provided by the optical source 302 may be referred to herein as an outgoing, transmitted, or incident beam, while the beam reflected from the target may be referred to herein as the incoming, received, or return beam. The optical beam may be delivered to an optical scanner and emitted into a field of view (FOV) of the LiDAR system.

The target path 305 includes a number of optical components (e.g. lenses, filters, and the like) through which the optical beam 303, which includes the scanning signal, passes on its way to a target 307. The return signal 309 may be reflected from the target 307 and directed to a photo detector 311 (e.g., included in the optical receivers 104 in FIG. 1A). In some embodiments, a local oscillator (LO) signal 313, which is a portion of the optical beam 303, is directed to the photo detector 311 to mix with the return signal 309. From the photo detector 311, a digitally sampled target signal 316 then passes to the signal processing unit 112.

As depicted in FIG. 3, the LiDAR system 100 includes the reference path 327 to generate one or more digitally sampled reference signals 326 that can be used to estimate the phase noise of the optical source 301 in the transmitted signals. In this fashion, reference path 327 creates one or more digitally sampled reference signals 326 corresponding to the target (e.g., target 307) at a known delay with the phase noise similar to that on the received signal from the target 307. The one or more digitally sampled reference signals 326 may be used to estimate the phase noise of the optical source 301 for subsequent correction.

For instance, the reference path 327 receives a portion 319 of the optical beam 303, which may be provided to a photo detector 304 (e.g., included in the optical receivers 104 in FIG. 1A) directly, and also after passing through a delay device 323 having a known length and/or delay. According to some embodiments, the signal portion 319 is received by the photo detector 304 in the reference arm 327 as the scanning signal of the optical beam 303 is transmitted contemporaneously through the optical components of the target arm 305. According to some embodiments, the signal portion 319 is received by the photo detector 304 after the scanning signal of the optical beam 303 is transmitted through the optical components of the target path 305. According to some embodiments, the delay device 323 may be a fiber delay device, etc. In one embodiment, the delay device 323 may include a fiber coil with a known length that may create a virtual target (e.g., fiber target) at a known distance.

In some scenarios, the virtual target's distance may be pre-determined. An optical signal 339 at the output of the reference delay 323 may have the same characteristics as the target return signal 202 depicted in FIG. 2. According to some embodiments, in a manner similar to that described in FIG. 2, virtual targets described herein may produce the optical signal 339 that is a time-delayed version of the optical beam 303.

Referring to FIG. 3, the photo detector 304 may receive the optical signal 339 and a reference LO signal 333. As an example, the reference path 327 may also include a reference LO generator 335 to generate the reference LO signal 333, which is a portion of the optical beam 303. The optical signal 339 is the portion 319 of the optical beam 303 after the reference delay 323 along the reference path. When the optical signal 339 is optically mixed with the reference LO signal 333, a beat frequency is generated.

The photo detector 304 may receive, via the reference path 327, a portion of the optical beam 303 transmitted through an optical interferometer (e.g., 335 and 323) to generate the beat frequency signal. As illustrated in FIG. 3, a portion of the optical beam 303 may be captured by the photo detector 304 and used to generate a feedback signal for the digital EOPLL 160. The digital EOPLL 160 of the optical drivers 103 receives the beat frequency and a reference frequency signal. The reference frequency signal and the beat frequency signal form a closed loop feedback signal to allow the beat frequency signal to be locked at a predetermined reference frequency. The digital EOPLL 160 may be configured to maintain the optical beam generated by the optical source 301 at the predetermined reference frequency. As will be depicted in various embodiments herein, digital EOPLL 160 may be implemented in various scenarios in order to achieve the advantages disclosed herein. The optical drivers 103 may generate the drive signal to drive and control the optical source 301.

Figure 4:
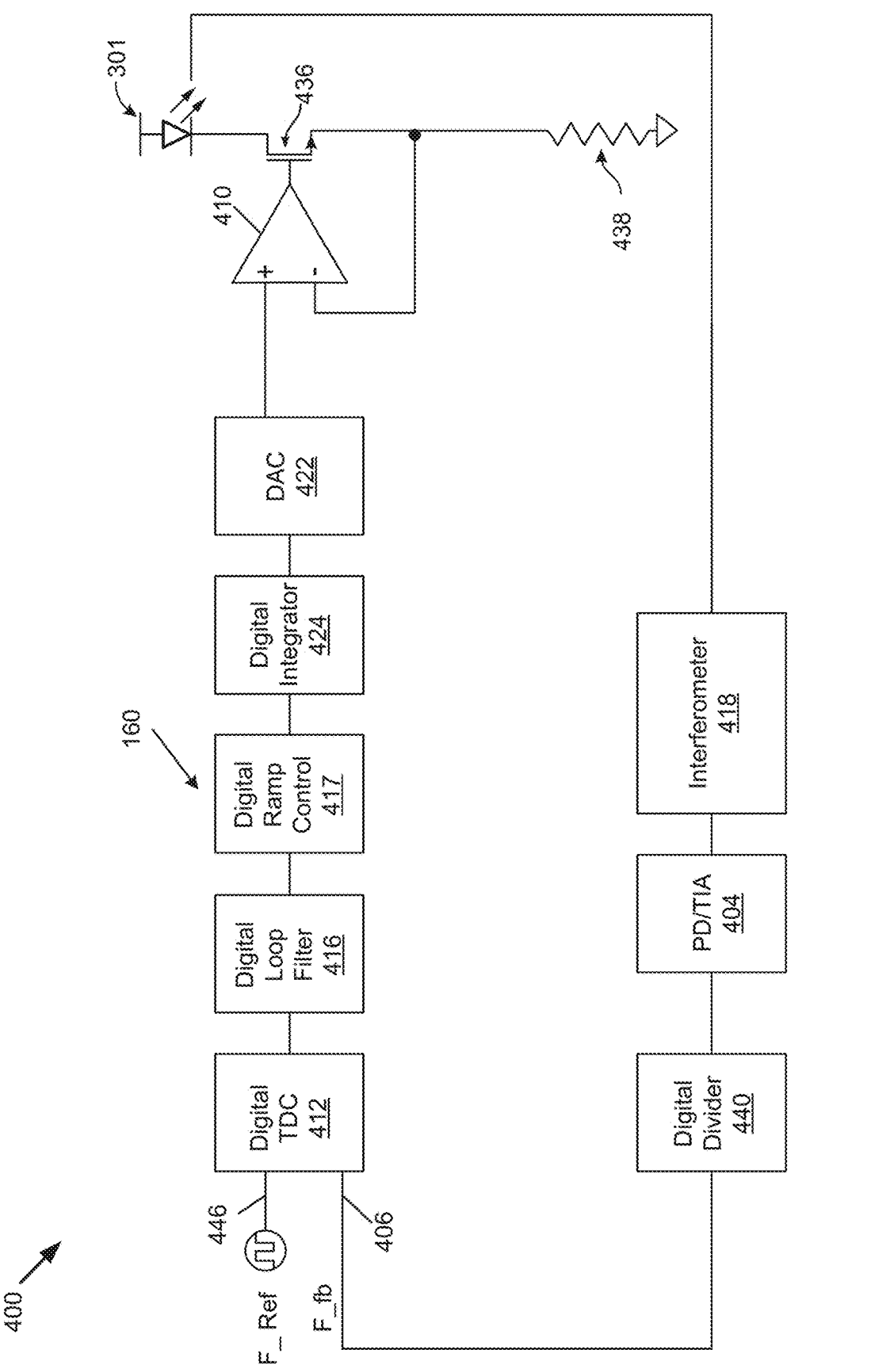
FIG. 4 is a block diagram illustrating an example of an optical drive electronic circuit including a digital EOPLL of a LiDAR system according to embodiments of the present disclosure.

FIG. 4 is a block diagram illustrating an example of an optical drive electronic circuit 400 including the digital EOPLL 160 of the LiDAR system 100 according to embodiments of the present disclosure. The optical drive electronic circuit 400 includes the digital EOPLL 160. The digital EOPLL 160 is a feedback loop that is configured to maintain the light generated by an optical source 301 at a target frequency, e.g., a predetermined reference frequency. The digital EOPLL 160 includes a TDC 412, a digital loop filter 416, a digital ramp control 417, a digital integrator 424, a DAC 422, an optical interferometer 418, and a photodetector (PD)/transimpedance amplifier (TIA) 404.

As illustrated in FIG. 4, two clocked signals, a reference frequency signal (F_Ref) 446 and a beat frequency feedback signal (F_fb) 406, are input into the digital TDC 412. The digital TDC 412 detects the phase values of the reference frequency and the beat frequency. As an example, the digital TDC 412 may measure when a rising edge (e.g., an edge transition) of the reference frequency signal F_Ref 446 arrives. The digital TDC 412 may measure when a rising edge (e.g., an edge transition) of the beat frequency feedback signal (F_fb) 406 arrives. The digital TDC 412 may calculate a phase difference between the reference frequency signal (F_Ref) 446 and the beat frequency signal (F_fb) 406. The digital TDC 412 may calculate the phase difference based on the time difference between the edge transition of the F_Ref 446 and the edge transition of F_fb 406. For example, the phase difference may be a time-averaged phase difference. The output of the digital TDC 412 controls the digital ramp control 417 based on whether the beat frequency feedback signal F_fb 406 is lagging or leading the reference frequency signal F_Ref 446. The reference input F_Ref 446 to the digital TDC 412 is a signal whose frequency is used as a reference frequency that controls the rate of change of the optical beam frequency.

The digital loop filter 416 may be coupled to the TDC 412 to generate an output based on the phase difference between the reference frequency F_Ref 446 and the beat frequency signal F_fb 406. The digital loop filter 416 may generate a response to the phase difference (e.g., phase error values) detected by the TDC 412. The digital loop filter 416 may be configured to ensure the closed loop is stabilized. For example, the digital loop filter 416 may take the phase difference (e.g., phase error values) from the TDC 412, applying digital filtering to output a proper response. For example, the digital loop filter 416 may smooth phase error values or filter out some of the high numbers. The digital loop filter 416 may slow down the instantaneous error from the TDC 412 and prevent the fast changes from being applied directly to the optical source, in order to maintain stability. The digital loop filter 416 may be adjustable and/or programmable to tune the response to the phase difference (e.g., phase error values). The digital loop filter 416 may set the bandwidth of the entire feedback loop. The digital loop filter 416 may include a plurality of gates. For example, the bandwidth of the digital loop filter 416 may be configurable and adjustable by a processor, e.g., the signal processing unit 112 as illustrated in FIG. 1A. The digital loop filter 416 may be significantly smaller than a conventional analog loop filter.

The digital ramp control 417 may be configured to produce a ramp down or ramp up control signal to increase or decrease the current chirp rate based on the phase difference between the reference frequency signal F_Ref 446 and the beat frequency feedback signal F_fb 406. For example, if the phase difference is a positive value (F_fb is lagging F_Ref), which indicates that the frequency of the optical signal output by the optical source is too low, the digital ramp control 417 may produce a ramp down control signal to increase the current chirp rate to an increased/chirp rate. If the phase difference is a negative value (F_fb is leading F_Ref), which indicates that the frequency of the optical signal output by the optical source 301 is too high, the digital ramp control 417 may produce a ramp up control signal to decrease the current chirp rate to a decreased chirp rate. The direction of the phase difference (e.g., phase error values) detected by the TDC 412 is used to control the digital ramp control 417 through the digital loop filter 416. The chirp direction of the optical source 301 may continuously alternates between up-chirp and down-chirp, since the optical source chirp cannot increase in frequency forever. The digital ramp control 417 may reverse the chirp ramp direction by swapping outputs, which reverses the voltage polarity given to the digital integration 424. For example, the output of the digital ramp control 417 may reverse the polarity, with the control signal being either positive or negative.

The digital integrator 424 may generate a digital output based on the output from the digital ramp control 417, the ramp down control signal and/or the ramp up control signal. The output of the digital ramp control 417 comes into the digital integrator 424. For example, the digital integrator 424 may act as a counter. The digital integrator 424 may count at a rate which is determined by the input number, which may be the output from the digital ramp control 417. The digital integrator 424 may take the input number and turn it into a slope of the signal. For example, if the input number is zero, the digital integrator 424 may stay flat. If the input number is a slight positive number, then the output of the digital integrator 424 may start to have a slope of the signal. If the input number is a bigger number, then the output of the digital integrator 424 may have a steeper slope of the signal. The digital ramp control 417 may cause the digital integrator 424 to generate a signal pattern, for example, the signal pattern shown in FIG. 2. The digital integrator 424 may take the alternating positive and negative control signal from the digital ramp control 417, and generates a positive or negative voltage ramp. The phase difference, e.g., the increasing or decreasing amount of error, may keep the slope of the signal at the correct rate such that the optical source may chirp at the correct rate. If the chirp rate may be too fast, the digital integrator 424 may slow it down. If the chirp rate may be too slow, the digital integrator 424 may speed it up. Thus, the output of the digital integrator 424 may include the increasing or decreasing series of values.

The output of the digital integrator 424 may be fed into the DAC 422. The DAC 422 may convert the digital output to an analog output to produce the drive signal. The drive signal may then drive the optical source 301 to adjust the modulating current. For example, the frequency of the optical beam produced by the optical source 301 is proportional to the current driving the optical source 301. Thus, the optical beam frequency changes with the ramped current, producing the optical beam chirp.

The optical drive electronic circuit 400 is configured to control the frequency change of the optical source 301 to be linear. The digital EOPLL 160 may generate a linear chirp from the optical source 301 by locking the beat frequency to the predetermined reference frequency. The closed loop feedback system may correct the beat frequency based on the reference frequency. The reference frequency can be modified according to the application requirements. A linear chirp based on the digital EOPLL 160 may ensure linearity even when operating conditions change. In the phase locked loop, the beat frequency based on the optical source rate of frequency change is compared to the reference frequency, to drive the optical source. The reference frequency F_Ref 446 may be applied to the optical drive electronic circuit 400. The optical drive electronic circuit 400 may power the optical source 301 to emit a beam of light into the optical interferometer 418. The interferometer 418 may produce an optical energy that beats with the beat frequency that is proportional to the light frequency rate of change. The digital EOPLL 160, with a reference frequency signal F-ref 446 and a beat frequency signal F_fb 406 as inputs, form a closed feedback loop to allow the beat frequency signal to be locked at the predetermined reference frequency.

The beat frequency may be fed back to the digital EOPLL 160 and compared with the reference frequency. According to the difference between the beat frequency and the reference frequency, the optical drive electronic circuit 400 may correct the optical source drive current to keep the beat frequency locked to the reference frequency. With the optical source frequency rate of change thus locked to the reference frequency, the optical source produces a linear phase chirp with a locked ramp rate. Changing the reference frequency changes the ramp rate of the optical beam linear phase chirp, e.g., the ramp rate at which the optical beam frequency changes. Dynamic control of chirp ramp rate is available through control of the reference frequency. Since the beat frequency is locked to the reference frequency through the phase locked loop, when the reference frequency input to the phase locked loop is varied, the ramp rate of change of laser light source frequency varies likewise.

The optical source 301 may include a laser diode, which includes the functionality to generate the optical beam. The frequency of the optical beam produced by the optical source 301 is proportional to the amplitude of the current that drives the optical source 301. Different values of input current can produce different values of optical beam frequency. Thus, the optical beam frequency changes with the ramping increases and/or decreases of the current when producing the laser beam chirp.

Part of the light generated by the optical source 301 is captured and input to the optical interferometer 418, which may be a Mach-Zehnder Interferometer (MZI), for example. The optical interferometer 418 may split some of the optical beam into two optical paths (e.g., fiber optic paths) of different lengths, then recombine the light from each of the two different length paths to generate the optical energy at the beat frequency (e.g., as illustrated in FIG. 3). Any instantaneous difference in frequency of the two recombined light signals can be used to produce the beat frequency.

The beat frequency is detected by the photodetector 404 (e.g., included in the optical receivers 104 in FIG. 1A), which in some embodiments, may be a photodiode followed by a transimpedance amplifier (PD/TIA) that converts the current signal from the photodiode into a voltage signal. The photodetector 404 detects the beat frequency from the combined light paths and feeds the beat frequency back to the TDC 412 as the feedback signal 406, F_fb. The frequency of the feedback signal may indicate the rate of change in the frequency of the light emitted by the optical source 301. The optical drive electronic circuit 400 may include a digital divider 440, which may reduce the frequency of the signal. If the digital divider 440 is dividing by two, then the beat frequency is two times the reference frequency. The digital divider 440 may be used for high beat frequencies.

The optical drive electronic circuit 400 may include a modulation transistor 436 that draws current through the optical source 301 and may be controlled by an operational amplifier (OpAmp) 410, which is configured as an error amplifier. The amplitude of the modulation current drawn through the optical source 301 may be determined by the amplitude of the voltage at the noninverting input of the modulation OpAmp 410 and the resistance of the modulation resistor 438. The optical drive electronic circuit 400 may generates a modulated voltage signal that is input to the modulation circuit so that the current through the optical source 301 may be modulated to generate the up chirps and down chirps.

It will be appreciated that various modifications can be made to the modulation drive circuit described above without deviating from the scope of the claims. For example, although the modulation transistor 436 is shown as a field effect transistor (FET), the transistor may be any suitable variety, including a bipolar junction transistor (BJT), and others. Additionally, the modulation resistor 438 may be positioned in a source follower configuration as shown or an emitter follower configuration.

The digital EOPLL 160 may have a small area footprint and allow for the increased portability. In addition, the digital EOPLL may increase the scalability and flexibility of the optical drive control circuit. The digital EOPLL is easily scalable due to the small geometry CMOS technologies, for example, with external power FET. The digital EOPLL 160 is flexible because it is programmable and configurable, for example, by a processor. For example, the time digital convertor, the digital loop filter, the digital ramp control, and/or the digital integrator is programmable by a processor, e.g., the signal processing unit 112 as illustrated in FIG. 1A.

FIG. 5 is a flow diagram illustrating an example of a method of using a digital EOPLL in a LiDAR system according to embodiments of the present disclosure. Method 500 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. For example, the method 500 may be performed by optical circuits 101, optical drivers 103, optical receivers 104, and/or the signal processing unit 112 of the LiDAR system 100, as illustrated in FIG. 1A-FIG. 1B. For example, some operations of the method may be performed by the digital EOPLL 160 in the optical drivers 103. The digital EOPLL may have a small area footprint and allow for the increased portability. In addition, the digital EOPLL may increase the scalability and flexibility of the optical drive control circuit. The digital EOPLL is easily scalable due to the small geometry CMOS technologies, for example, with external power FET. The digital EOPLL is flexible because it is programmable and configurable, for example, by a processor.

Referring to FIG. 5, at block 502, an optical source receives a drive signal to cause an optical beam to be transmitted according to a current chirp rate along a target path and a reference path. At block 504, a photodetector receives, via the reference path, a portion of the optical beam transmitted through an optical interferometer to generate a beat frequency signal.

At block 506, an optical drive electronic circuit receives a reference frequency signal and the beat frequency signal to generate the drive signal. At block 508, a time-to-digital convertor (TDC) calculates a phase difference between the reference frequency signal and the beat frequency signal. At block 510, provided the phase difference is a positive value, a digital ramp control produces a ramp down control signal to increase the current chirp rate to an increased chirp rate. At block 512, provided the phase difference is a negative value, digital ramp control produces a ramp up control signal to decrease the current chirp rate to a decreased chirp rate. At block 514, a digital integrator generates a digital output based on at least one of the ramp down control signal or the ramp up control signal. At block 514, a digital to analog convertor to converts the digital output to an analog output to produce the drive signal.

The preceding description sets forth numerous specific details such as examples of specific systems, components, methods, and so forth, in order to provide a thorough understanding of several examples in the present disclosure. It will be apparent to one skilled in the art, however, that at least some examples of the present disclosure may be practiced without these specific details. In other instances, well-known components or methods are not described in detail or are presented in block diagram form in order to avoid unnecessarily obscuring the present disclosure. Thus, the specific details set forth are merely exemplary. Particular examples may vary from these exemplary details and still be contemplated to be within the scope of the present disclosure.

Any reference throughout this specification to "one example" or "an example" means that a particular feature, structure, or characteristic described in connection with the examples are included in at least one example. Therefore, the appearances of the phrase "in one example" or "in an example" in various places throughout this specification are not necessarily all referring to the same example.

Although the operations of the methods herein are shown and described in a particular order, the order of the operations of each method may be altered so that certain operations may be performed in an inverse order or so that certain operations may be performed, at least in part, concurrently with other operations. Instructions or sub-operations of distinct operations may be performed in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Furthermore, the terms "first," "second," "third," "fourth," etc. as used herein are meant as labels to distinguish among different elements and may not necessarily have an ordinal meaning according to their numerical designation.

What is claimed is:

1. A frequency modulated continuous wave (FMCW) light detection and ranging (LiDAR) system, comprising:
an optical source to receive a drive signal to cause an optical beam to be transmitted according to a current chirp rate along a target path and a reference path;
a photodetector to receive, via the reference path, a portion of the optical beam transmitted through an optical interferometer to generate a beat frequency signal; and
an optical drive electronic circuit to receive a reference frequency signal and the beat frequency signal to generate the drive signal, the optical drive electronic circuit comprising:
a time-to-digital convertor (TDC) to calculate a phase difference between the reference frequency signal and the beat frequency signal;
a digital ramp control to:
provided the phase difference is a positive value, produce a ramp down control signal to increase the current chirp rate to an increased chirp rate;
provided the phase difference is a negative value, produce a ramp up control signal to decrease the current chirp rate to a decreased chirp rate;
a digital integrator to generate a digital output based on at least one of the ramp down control signal or the ramp up control signal; and
a digital to analog convertor to convert the digital output to an analog output to produce the drive signal.

2. The FMCW LiDAR system of claim 1, wherein the reference frequency signal and the beat frequency signal form a closed loop feedback signal to allow the beat frequency signal to be locked at a predetermined reference frequency.

3. The FMCW LiDAR system of claim 1, wherein the phase difference is a time-averaged phase difference.

4. The FMCW LiDAR system of claim 1, wherein the optical interferometer is a Mach-Zender-Interferometer.

5. The FMCW LiDAR system of claim 1, wherein the optical drive electronic circuit is to control the frequency change of the optical source to be linear.

6. The FMCW LiDAR system of claim 1, further comprising:

a digital loop filter coupled to the time digital convertor to generate an output based on the phase difference between the reference frequency and the beat frequency signal.

7. The FMCW LiDAR system of claim 6, wherein at least one of the time digital convertor, the digital loop filter, the digital ramp control, or the digital integrator is programmable by a processor.

8. The FMCW LiDAR system of claim 6, wherein a bandwidth of the digital loop filter is adjustable by a processor.

9. A method of operating a frequency modulated continuous wave (FMCW) light detection and ranging (LiDAR) system, comprising:
receiving a drive signal to cause an optical beam to be transmitted according to a current chirp rate along a target path and a reference path;
receiving, via the reference path, a portion of the optical beam transmitted through an optical interferometer to generate a beat frequency signal; and
receiving a reference frequency signal and the beat frequency signal to generate the drive signal, comprising:
calculating a phase difference between the reference frequency signal and the beat frequency signal;
provided the phase difference is a positive value, producing a ramp down control signal to increase the current chirp rate to an increased chirp rate;
provided the phase difference is a negative value, producing a ramp up control signal to decrease the current chirp rate to a decreased chirp rate;
generating a digital output based on at least one of the ramp down control signal or the ramp up control signal; and
converting the digital output to an analog output to produce the drive signal.

10. The method of claim 9, further comprising:
forming a closed loop feedback signal to allow the beat frequency signal to be locked at a predetermined reference frequency.

11. The method of claim 9, wherein the phase difference is a time-averaged phase difference.

12. The method of claim 9, further comprising:
controlling the frequency change of the optical source to be linear.

13. The method of claim 9, further comprising:
generating an output based on the phase difference between the reference frequency and the beat frequency signal; and
adjusting a bandwidth of the output by a processor.

14. An electro-optical system, comprising:
an optical drive electronic circuit to receive a reference frequency signal and a beat frequency signal to generate a drive signal for an optical source, the optical drive electronic circuit comprising:
a time-to-digital convertor (TDC) to calculate a phase difference between the reference frequency signal and the beat frequency signal;
a digital ramp control to:
provided the phase difference is a positive value, produce a ramp down control signal to increase the current chirp rate to an increased chirp rate;
provided the phase difference is a negative value, produce a ramp up control signal to decrease the current chirp rate to a decreased chirp rate;
a digital integrator to generate a digital output based on at least one of the ramp down control signal or the ramp up control signal; and

a digital to analog convertor to convert the digital output to an analog output to produce the drive signal.

15. The electro-optical system of claim 14, wherein the reference frequency signal and the beat frequency signal form a closed loop feedback signal to allow the beat frequency signal to be locked at a predetermined reference frequency.

16. The electro-optical system of claim 14, wherein the phase difference is a time-averaged phase difference.

17. The electro-optical system of claim 14, wherein the optical drive electronic circuit is to control the frequency change of the optical source to be linear.

18. The electro-optical system of claim 14, further comprising:

a digital loop filter coupled to the time digital convertor to generate an output based on the phase difference between the reference frequency and the beat frequency signal.

19. The electro-optical system of claim 18, wherein at least one of the time digital convertor, the digital loop filter, the digital ramp control, or the digital integrator is programmable by a processor.

20. The electro-optical system of claim 18, wherein a bandwidth of the digital loop filter is adjustable by a processor.

* * * * *